Aug. 31, 1954    T. R. BEAUCHAMP    2,687,912
GRILLE GUARD
Filed Jan. 15, 1949    2 Sheets-Sheet 1
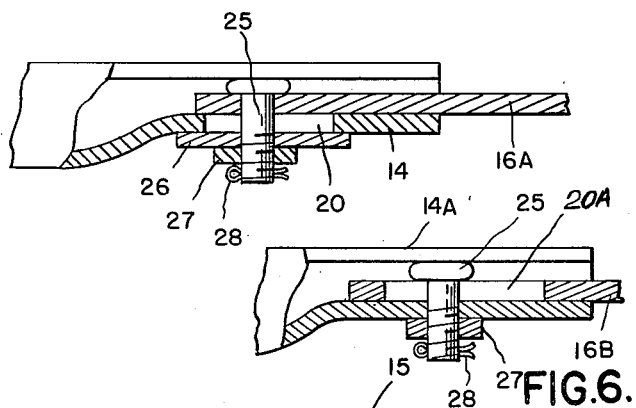
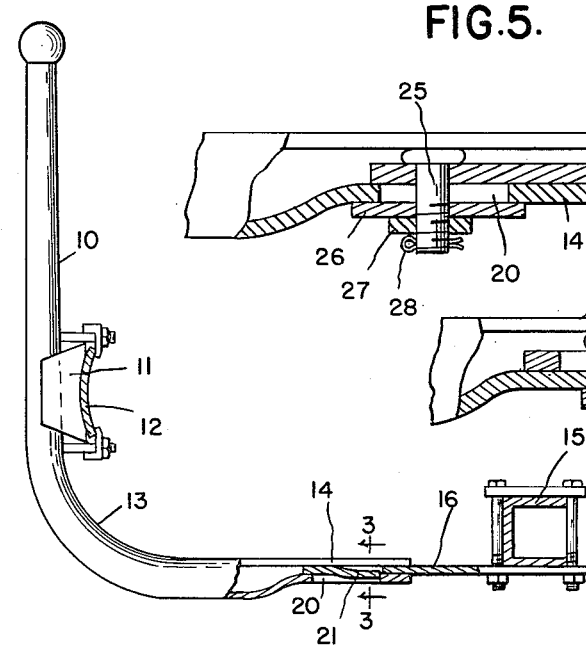
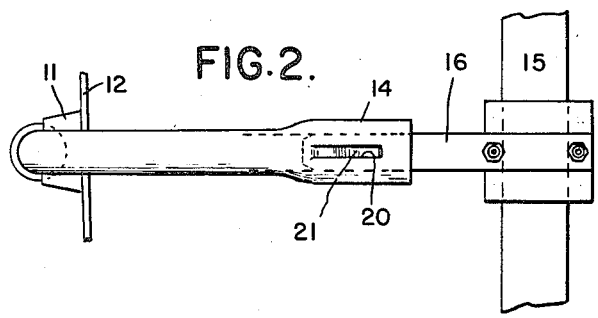
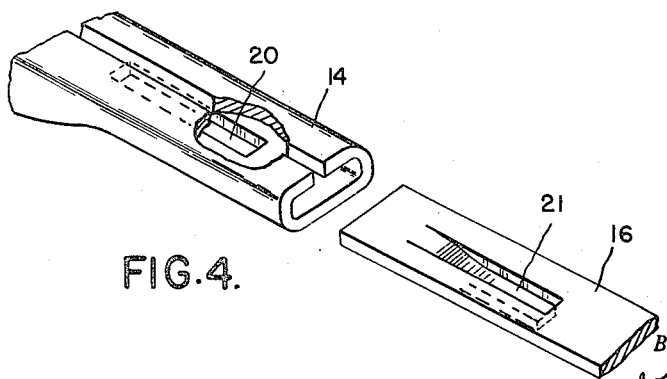
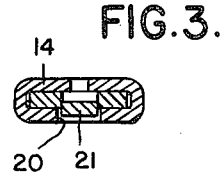
INVENTOR.
THOMAS R. BEAUCHAMP
BY
ATTORNEYS Aug. 31, 1954 T. R. BEAUCHAMP 2,687,912
GRILLE GUARD
Filed Jan. 15, 1949 2 Sheets-Sheet 2

INVENTOR.
THOMAS R. BEAUCHAMP
BY
*Hauke & Hardesty*
ATTORNEYS

Patented Aug. 31, 1954

2,687,912

UNITED STATES PATENT OFFICE 2,687,912

GRILLE GUARD

Thomas R. Beauchamp, Detroit, Mich.

Application January 15, 1949, Serial No. 71,053

3 Claims. (Cl. 293—64)

1

The present invention relates to grille guards for automotive vehicles and more specifically to an improvement of the type of guard shown in U. S. Pat. No. 2,281,215, issued April 28, 1942.

Among the objects of the present invention is the provision of means to greatly strengthen the guard against certain types of impacts.

Another object is to increase such strengthening without a material increase in the cost of production.

Other objects and advantages will be apparent to those skilled in the art upon reference to the following description and in the accompanying drawings in which Fig. 1 is a view partly in section and partly in elevation of a guard embodying the invention.

Fig. 2 is a bottom plan view of the same.

Fig. 3 is a section on line 3—3 of Fig. 1.

Fig. 4 is an exploded view of the parts embodying the invention.

Fig. 5 is a sectional view of a modification.

Fig. 6 is a similar view of another modification.

Figure 7:
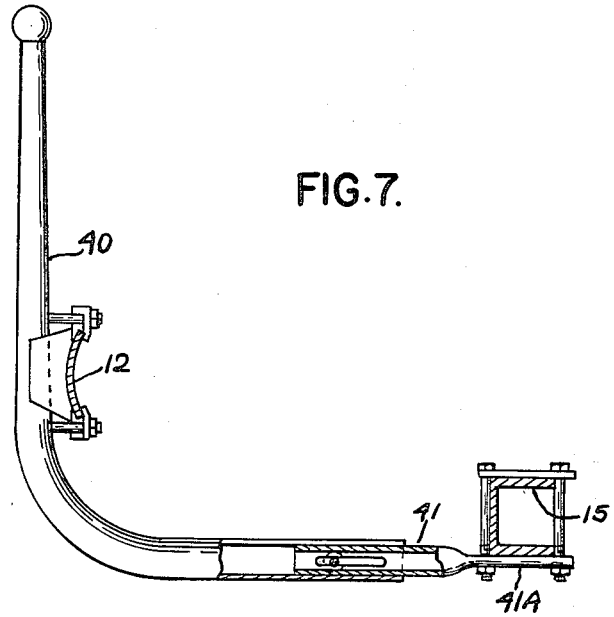
Fig. 7 is a view similar to Fig. 1, but of a modification.

In the drawings, a guard of the type shown in the patent referred to is illustrated. This consists of a tubular member 10 fixed in suitable fashion as by means of a saddle clamp 11 to the conventional bumper shown in cross section at 12. The member 10 extends from some distance, approximately a foot, above the bumper 12 vertically downward to below the latter, and is curved as shown at 13, and then extends backward of the vehicle a short distance in a horizontal direction, being flattened for several inches at its end as shown at 14.

This flattened end 14 is spaced from but substantially on a level with the bottom face of a body frame member 15 and to the latter is clamped a flat spring arm 16 which extends forward and slidingly fits into the flat end portion 14, extending thereinto a short distance when the parts are inactive.

The description thus far is of the patented construction.

In the use of this construction, impacts on the guard at or below bumper level or at a point only a short distance above bumper level, result merely in flexing the spring bumper and causing the spring arm 16 to slide in the end 14. However, impacts on the guard at points above the

2 bumper, as the upper portion of the member 10 is moved back, the result being that the lower portion, including end 14, moves forward and decreases the overlap of end 14 and arm 16 so that the supporting function of the latter decreases. In extreme cases, the end 14 may be pulled all of the way from the arm 16.

The present invention is designed to overcome this difficulty by maintaining the supporting action of arm 16 at all times and preventing the disconnection of the arm and guard.

The change in structure is shown in Figs. 1 to 4 to consist in providing a slot 20 in the under portion of the end 14 and in punching out a tongue 21 in arm 16 so that the free end of the tongue contacts the rear end of the slot whenever an impact tends to separate the arm from the guard.

The tongue and slot should be so proportioned and arranged that the inward movement of tongue will not be affected. Instead of the tongue 21 coacting with slot 20, similar results may be obtained by the use of a suitable stud or bolt fixed in the end portion of arm 16.

Such construction is shown in Fig. 5. In this construction, through the end portion of arm 16A and slot 20 in end 14 is a short bolt 25, a suitable washer 26, nut 27 and cotter pin 28 being used if desired.

In order to enable the assembly of the form shown in Fig. 5, a suitable slot may be provided in the upper wall of the end 14.

In Fig. 6 is shown a modification which is an alternative to that of Fig. 5. In Fig. 6 the slot 20A is in the bar 16B, while the bolt 25 passes through a suitable opening in the end portion 14A. The bolt 25 may of course be provided with a nut 27 and cotter pin 28.

Figure 8:
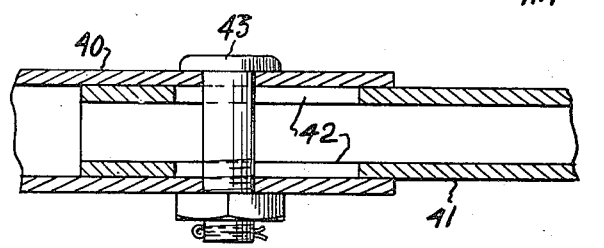
Fig. 8 is a horizontal section of the slip joint of Fig. 7.

In the form of the device shown in Figs. 7 and 8, the tubular member 40 is similar to element 10, except that its rearwardly extending portion is not flattened. It is mounted on bumper 12 by the same means as has been described.

Further, instead of the flat spring member 16, a tubular member 41 is used, the front end being telescoped into member 40 and the rear end being flattened as at 41A to facilitate attachment to frame member 15.

In that portion of member 41 telescoped into member 40, slots 42 are provided and through these and through suitable openings in member 40 is passed a bolt 43 serving to limit the relative movement of the two parts.

Figure 9:
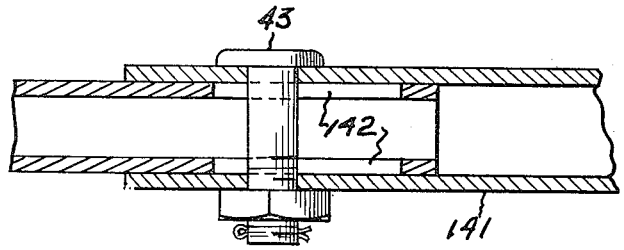
Fig. 9 is a similar section of an alternate form of the latter.

Fig. 9 shows an alternative construction in that in this form the slots 142 are in the member 140 corresponding to members 10 and 40, while the member 141 corresponds to member 41 and carries the bolt 43.

I claim:

1. In a grille guard for a motor vehicle provided with a bumper and with an impact receiving member fixed to said bumper and extending from above to below the latter, the portion below the bumper being bent backward of the vehicle and substantially horizontal, and with a spring arm fixed to the vehicle body and telescoping slidingly into said horizontal portion, means for limiting relative movement of said arm and said horizontal portion, said means consisting of coacting abutments carried by said arm and portion and adapted to contact and thereby limit such outward movement.

2. In a grille guard for a motor vehicle provided with a bumper and with an impact receiving member fixed to said bumper and extending from above to below the latter, the portion below the bumper being bent backward of the vehicle and substantially horizontal, and with a spring arm fixed to the vehicle body and telescoping slidingly into said horizontal portion, means for limiting relative movement of said arm and said horizontal portion, said means consisting of a slot in the said horizontal portion and a fixed abutment carried by said arm and extending into said slot.

3. In a grille guard for a motor vehicle provided with a bumper and with an impact receiving member fixed to said bumper and extending from above to below the latter, the portion below the bumper being bent backward of the vehicle and substantially horizontal, and with a spring arm fixed to the vehicle body and telescoping slidingly into said horizontal portion, means limiting relative sliding movement of said arm and horizontal portion, said means consisting of a bolt carried by one of these elements and movable in a suitable slot in the other of said elements.

References Cited in the file of this patent

UNITED STATES PATENTS

| Number | Name | Date |
|---|---|---|
| 1,798,278 | Scott et al. | Mar. 31, 1931 |
| 2,173,276 | Jandus et al. | Sept. 19, 1939 |
| 2,281,215 | Van Auken | Apr. 28, 1942 |
| 2,288,978 | Talley | July 7, 1942 |